United States Patent Office 3,147,241
Patented Sept. 1, 1964

3,147,241
USE OF HYDROGEN AND QUATERNARY AMMO-
NIUM HALIDES IN ORGANOMETAL CATA-
LYZED OLEFIN POLYMERIZATION
Charles W. Moberly, Bartlesville, Okla., assignor to Phillips Petroleum Company, a corporation of Delaware
No Drawing. Filed June 30, 1961, Ser. No. 120,977
7 Claims. (Cl. 260—93.7)

This invention relates to an improved olefin polymerization process.

Polymers of alpha-olefins, particularly of propylene, have long been known and numerous procedures have been disclosed for their production. These polymers are characterized by a greater or lesser degree of stereo-specificity, i.e., the presence of a certain amount of a crystalline component frequently designated as isotactic polymer. Many of the useful properties of these polymers such as ultimate tensile, hardness, range of melting temperatures, etc. appear to depend upon the stereo-specificity of the polymer. Flexural modulus, a property readily measurable by standard procedures, provides a reliable and consistent means for characterizing these polymers. The higher the stereospecificity of a polymer, the higher the flexural modulus values are found to be. For a commercially attractive product, flexural modulus values must be high, preferably above 200,000 p.s.i. and more preferably above 225,000 p.s.i. Heretofore it has frequently been necessary to extract amorphous fractions of the polymer in order to provide products having flexural moduli in this range.

Another requirement for these polymerization procedures is a high level of productivity of polymer based on catalyst. The stereospecific catalyst systems used in these operations are expensive and cannot be regenerated. Thus a high productivity in pounds of useful polymer per pound of catalyst is an important feature of any commercially attractive process.

One method by which significant improvements are realized, both in increased productivity and high stereospecific level, comprises conducting the polymerization in the presence of hydrogen. This method of operation also has the advantage of providing a means for control of molecular weight in the product, thus improving processibility. A further refinement of this procedure involves conducting the polymerization in a medium comprising the liquid monomer. By so operating, problems heretofore encountered in recovering both product and solvent are eliminated. When so operating it is desirable to employ as the catalyst system a combination of a crystalline halide of a transition metal of Group IV, V, VI, or VIII, preferably of titanium such as titanium trichloride and an organometal halide of a Group III metal, such as diethylaluminum chloride. By the use of such a catalyst system control of reactions in liquid monomer is more readily maintained.

The metal halide component of the catalyst system comprises, preferably, the trihalides of the metals titanium, zirconium, hafnium and germanium. The trichlorides, trifluorides, tribromides, and triiodides of the aforementioned metals can be used in the catalyst system of this invention, either individually or as a mixture of two or more of the metal halides. Examples of metal halides which can be used include titanium trichloride, titanium tribromide, titanium trifluoride, zirconium trichloride, zirconium tribromide, germanium trichloride, germanium tribromide, and the like.

In admixture with at least one of the metal halides, the catalyst comprises at least one organometal halide corresponding to the formula $R_mMX_n$ wherein R is a saturated acyclic hydrocarbon radical, a saturated cyclic hydrocarbon radical, an aromatic hydrocarbon radical, or combinations of these radicals, wherein M is a metal selected from the group consisting of aluminum, gallium, indium, thallium and beryllium, and wherein X is a halogen. The $m$ and $n$ are integers and the sum of $m$ and $n$ is equal to the valence of the metal M. X can be any of the halogens, including chlorine, bromine, iodine and fluorine. The saturated acyclic hydrocarbon radicals, saturated cyclic hydrocarbon radicals, and aromatic hydrocarbon radicals which can be substituted for R in the formula include hydrocarbon radicals having up to about 20 carbon atoms each. Radicals having 10 carbon atoms or less are preferred since the resulting catalyst composition has a greater activity for initiating the polymerization of olefins. Mixtures of one or more of these organometal halide components, such as a mixture of ethylaluminum dichloride and diethylaluminum chloride, can be used in our catalyst composition. Specific examples of other organometal halides which are useful in the catalyst composition of this invention are the following: $CH_3AlCl_2$, $(CH_3)_2AlCl$, $C_2H_5AlCl_2$, $$(C_2H_5)_2AlCl$$

$(C_2H_5)_2AlBr$, $(C_4H_9)_2AlBr$, $C_8H_{17}AlI_2$, $(C_3H_7)_2GaF$, $(C_6H_{11})_2GaCl$ (cyclohexane derivative), $(C_6H_5)GaBr_2$ (benzene derivative), $C_{20}H_{41}GaBr_2$, $(C_{14}H_{29})_2GaF$, $(C_6H_5)_2InCl$ (benzene derivative), $C_8H_{17}InF_2$, $$(C_6H_{11})InBr_2$$

(cyclohexane derivative), $C_{17}H_{35}BeI$, $CH_3BeBr$, 3-methylcyclohexylaluminum dichloride, 2-cyclohexylethylgallium dichloride, p-tolylberyllium iodide, di-(3-phenyl-1-methylpropyl)indium fluoride, 2-(3-isopropylcyclohexyl) ethylthallium dibromide, and the like.

An object of this invention is to provide an improved process for the production of olefin polymers.

A further object of this invention is to provide such a polymerization process in which increaed yields of polymer are produced.

A further object of this invention is to polymerize propylene by a polymerization process in which the flexural modulus can be increased.

Other objects of this invention will be apparent to those skilled in the art upon consideration of this disclosure.

According to my invention the polymerization is conducted in the presence of hydrogen and a quaternary ammonium halide. I have discovered that the advantages of the invention are realized only when both hydrogen and the quaternary ammonium halide are present, i.e., that a synergistic relationship exists between these additives. The quaternary ammonium halide alone provides little, if any, advantage and frequently leads to very definite reduction both in yield and stereospecificity. Hydrogen alone enhances both yield and flexural modulus by fairly significant amounts. However, the enhancement in these properties by the presence of both is far greater than the sums of the effects of the individual materials.

The quaternary ammonium halides employed are compounds of the general formula $R_4NX$ in which R is an alkyl group containing from 1 to 20 carbon atoms and X is a halogen from the group consisting of chlorine, bromine, or iodine. Examples of suitable compounds include tetramethylammonium iodide, tetraethylammonium iodide, tetrabutylammonium iodide, tetradecylammonium iodide, hexadecyltrimethylammonium iodide, tetraethylammonium chloride, tetraamylammonium bromide, tetraoctylammonium chloride, tetraundecylammonium bromide, hexadecyl trimethylammonium bromide, and tetraeicosylammonium chloride. The amount of quaternary ammonium halide employed will generally be in the range of 0.05 to 0.75, preferably between 0.15 and 0.75 mol per mol of Group IV, V, VI, or VIII metal halide.

The amount of hydrogen employed will be in the range between 0.025 and 2 mol percent based on monomer.

Temperature for the reaction will generally be in the range between 50 and 200° F., preferably between 90 and 175° F. Polymerization time will range from 5 minutes to 20 hours or longer but will generally be from 1 to 5 hours.

The preferred catalyst system is dialkylaluminum chloride and titanium trichloride, the latter preferably being prepared by reduction of titanium tetrachloride in the presence of aluminum. The reduction product is $$3TiCl_3 \cdot AlCl_3$$

The amount of dialkylaluminum chloride used will be at least $2.5 \times 10^{-4}$ grams per gram of monomer and can be as much as $25 \times 10^{-4}$ grams per gram of monomer. The amount of $3TiCl_3 \cdot AlCl_3$ will generally be in the range between $1.5 \times 10^{-4}$ and $10 \times 10^{-4}$ grams per gram of monomer. In general the mol ratio of the catalyst components is less critical than the presence of at least the minimum quantity of each. Mol ratios of dialkylaluminum chloride to $3TiCl_3 \cdot AlCl_3$ between 1:0.005 and 1:50 are operable with those between 1:0.1 and 1:10 being preferred.

Monomers for which the process is applicable include propylene, 1-butene, 1-pentene, 4-methyl-1-pentane, 3-methyl-1-butene, 3,3-dimethyl-1-butene, and the like. The polymerization is carried out under conditions such that the monomer is substantially completely in the liquid phase.

In the recovery of the polymer, removal of catalyst residues can be effected by any suitable method such as by washing with an alcohol such as methanol or isopropanol.

EXAMPLE I

A series of runs was made in which the effect of the presence of a combination of hydrogen and tetra-n-butylammonium iodide on the polymerization of propylene was studied. In these runs the polymerization was conducted using liquid propylene as the diluent and a combination of diethylaluminum chloride (DEAC) and $3TiCl_3 \cdot AlCl_3$ as the catalyst system. When calculating mol ratios of DEAC to $TiCl_3$ using this complex, the ratio is based on the $TiCl_3$ content.

In these runs the tetra-n-butylammonium iodide, if used, was charged to a 1-liter stainless steel reactor which had previously been purged at 250° F. with dry propylene. The $3TiCl_3 \cdot AlCl_3$ was then introduced followed by the diethylaluminum chloride as a 1.27 molar solution in n-heptane. Hydrogen, if used, was then charged followed by 150 grams of propylene, the foregoing charging procedures being effected at room temperature. Charging time for the propylene was 2 to 3 minutes. After charging was complete, the temperature was elevated to 115° F. where it was maintained for 2.5 hours. Propylene was then vented and the polymer, in the form of a fine powder, was transferred into about 500 ml. of methanol where it was allowed to remain overnight. It was then collected on a filter, washed with methanol, and dried overnight in a vacuum oven at 80° C. The polymer was then weighed and its flexural modulus determined by ASTM method D1238–57T. Data on these runs are shown in Table I.

*Table I*

| Run No. | TBAI G. | TBAI Mm. | $3TiCl_3 \cdot AlCl_3$, g. | $TiCl_3$, mm. | DEAC G. | DEAC Mm. | $H_2$, mol percent on $C_3^=$ | Mol ratio DEAC/$TiCl_3$/TBAI | Rate, g./g. $3TiCl_3 \cdot AlCl_3$/hr. | Flex. modulus, p.s.i. |
|---|---|---|---|---|---|---|---|---|---|---|
| 1 | 0 | 0 | 0.20 | 1.0 | 0.462 | 3.87 | 0 | 3.8/1/0 | 104 | 190,000 |
| 2 | 0 | 0 | 0.101 | 0.51 | 0.236 | 1.96 | 1.25 | 3.8/1/0 | 118 | 239,000 |
| 3 | 0.0598 | 0.162 | 0.107 | 0.54 | 0.252 | 2.10 | 0 | 3.9/1/0.3 | 97 | 177,000 |
| 4 | 0.0598 | 0.162 | 0.093 | 0.47 | 0.207 | 1.72 | 1.25 | 3.7/1/0.35 | 177 | 267,000 |

The data in Table I show that hydrogen added to the system resulted in an increase in rate of about 13.5 percent and that tetrabutylammonium iodide reduced the rate by about 7 percent. When both were present the rate was increased 70 percent. Similarly, hydrogen led to an increase of about 26 percent in flexural modulus while tetrabutylammonium iodide led to a decrease of about 7 percent in this value. Together, hydrogen and tetrabutylammonium iodide led to an increase of over 40 percent in flexural modulus.

EXAMPLE II

Runs were made at higher temperatures to determine whether rate could be increased and still obtain flexural modulus over 200,000 p.s.i. In these runs the catalyst system was DEAC/$TiCl_3$ complex at a weight ratio of 2.35:1. It was found that this flexural modulus value could be obtained at temperatures as high as 160° F. using the TBAI—$H_2$ combination. Rates as high as 672 g./g. $3TiCl_3 \cdot AlCl_3$/hr. and 596 g./g. $TiCl_3 \cdot AlCl_3$/hr. were found in runs of one and 2.5 hours duration, respectively. Data from polymerizations in one-liter reactors are recorded below:

| Run No. | Temp., ° F. | $3TiCl_3 \cdot AlCl_3$, g. | TBAI, g. | Hydrogen, mol percent of $C_3^=$ | Time, hrs. | Rate, g./g. $3TiCl_3 \cdot AlCl_3$/hr. | Flexural modulus, p.s.i. |
|---|---|---|---|---|---|---|---|
| 5 | 115 | 0.103 | 0.0203 | 1.25 | 2.5 | 125 | 275,000 |
| 6 | 115 | 0.101 | 0.0406 | 1.25 | 2.5 | 131 | 262,000 |
| 7 | 115 | 0.093 | 0.0598 | 1.25 | 2.5 | 177 | 267,000 |
| 8 | 130 | 0.091 | 0.0598 | 1.25 | 1.0 | 438 | 248,000 |
| 9 | 145 | 0.097 | 0.0598 | 1.25 | 1.0 | 505 | 240,000 |
| 10 | 160 | 0.101 | 0.0598 | 1.25 | 1.0 | 672 | 226,000 |
| 11 | 160 | 0.0499 | 0.0299 | 1.25 | 2.5 | 596 | 215,000 |
| 12 | 160 | 0.0478 | 0 | 1.25 | 2.5 | 314 | 160,000 |
| 13 | 160 | 0.0466 | 0 | 0 | 2.5 | 193 | 152,000 |

EXAMPLE III

Another series of runs was made at 130° F. using the catalyst system and the tetra-n-butylammonium iodide as in Example II. These runs show that, at this temperature, the combination of hydrogen and quaternary ammonium compound, improved rate and higher modulus are obtained. All were 2.5 hour runs.

| Run No. | $3TiCl_3 \cdot AlCl_3$, g. | TBAI, g. | Hydrogen, mol percent of $C_3^=$ | Rate, g./g. $3TiCl_3 \cdot AlCl_3$/hr. | Flexural modulus, p.s.i. |
|---|---|---|---|---|---|
| 14 | 0.057 | 0 | 0 | 140 | 168,000 |
| 15 | 0.060 | 0 | 1.25 | 211 | 202,000 |
| 16 | 0.067 | 0.0299 | 0 | 189 | 172,000 |
| 17 | 0.059 | 0.0299 | 1.25 | 272 | 238,000 |

EXAMPLE IV

Hexadecyltrimethylammonium bromide (HDTMAB) shows the same effect as tetra-n-butylammonium iodide in propylene polymerization. These runs were made at 115° F. for 2.5 hours using approximately 0.1 gram $3TiCl_3.AlCl_3$. The weight ratio diethlyaluminum chloride to $TiCl_3$ complex was 2.35 to 1 as before.

| Run. No. | HDTMAB, g. | Hydrogen, mol percent of $C_3^=$ | Rate, g./g. $3TiCl_3.AlCl_3$/ hr. | Flexural modulus, p.s.i. |
|---|---|---|---|---|
| 18 | 0.059 | 1.25 | 158 | 239,000 |
| 19 | 0 | 1.25 | 119 | 230,000 |
| 20 | 0.059 | 0 | 70 | 180,000 |

As many possible embodiments can be made of this invention without departing from the scope thereof, it is to be understood that all matter herein set forth is to be interpreted as illustrative and not as unduly limiting the invention.

I claim:
1. In the polymerization of α monoolefins of more than two carbon atoms to form solid polymer in the presence of an hydrocarbon metal halide of a Group III A metal and a trihalide of a Group IV transition metal, the improvement comprising conducting said polymerization in the presence of 0.025 to 2 mol percent of hydrogen based on the monoolefin and, per mol of Group IV metal trihalide, 0.05 to 0.75 mol of a compound of the formula $R_4NX$ where R is alkyl and X is halogen.
2. In the polymerization of α monoolefins of more than two carbon atoms to form solid polymer in the presence of an hydrocarbon metal halide of a Group III A metal and a titanium trihalide, the improvement comprising conducting said polymerization in the presence of 0.025 to 2 mol percent of hydrogen based on the monoolefin and, per mol of titanium trihalide, 0.05 to 0.75 mol of a compound of the formula $R_4NX$ where R is alkyl and X is halogen.
3. The process of claim 2 wherein said Group III metal is aluminum.
4. In the polymerization of α monoolefins of more than two carbon atoms in the presence of diethylaluminum chloride and $3TiCl_3.AlCl_3$, the improvement comprising conducting said polymerization in the presence of hydrogen and tetrabutylammonium iodide, wherein the amount of hydrogen is in the range of 0.025 to 2 mol percent based on the monoolefin and the amount of tetrabutylammonium iodide is in the range of 0.05 to 0.75 mol per mol of $3TiCl_3.AlCl_3$.
5. In the polymerization of α monoolefins of more than two carbon atoms in the presence of diethylaluminum chloride and $3TiCl_3.AlCl_3$, the improvement comprising conducting said polymerization in the presence of hydrogen and hexadecyltrimethylammonium bromide, wherein the amount of hydrogen is in the range of 0.025 to 2 mol percent based on the monoolefin and the amount of hexadecyltrimethylammonium bromide is in the range of 0.05 to 0.75 mol per mol of $3TiCl_3.AlCl_3$.
6. In the polymerization of propylene in the presence of diethylaluminum chloride and $3TiCl_3.AlCl_3$, the improvement comprising conducting said polymerization in the presence of hydrogen and tetrabutylammonium iodide, wherein the amount of hydrogen is in the range of 0.025 to 2 mol percent based on the propylene and the amount of tetrabutylammonium iodide is in the range of 0.05 to 0.75 mol per mol of $3TiCl_3.AlCl_3$.
7. In the polymerization of propylene in the presence of diethylaluminum chloride and $3TiCl_3.AlCl_3$, the improvement comprising conducting said polymerization in the presence of hydrogen and hexadecyltrimethylammonium bromide, wherein the amount of hydrogen is in the range of 0.025 to 2 mol percent based on the propylene and the amount of hexadecyltrimethylammonium bromide is in the range of 0.05 to 0.75 mol per mol of $3TiCl_3.AlCl_3$.

References Cited in the file of this patent

UNITED STATES PATENTS

| 2,912,424 | Cash | Nov. 10, 1959 |
| 3,001,951 | Tornqvist et al. | Sept. 26, 1961 |
| 3,040,014 | Lovett et al. | June 19, 1962 |
| 3,051,690 | Vandenberg | Aug. 28, 1962 |

FOREIGN PATENTS

| 551,905 | Belgium | Apr. 18, 1957 |
| 554,242 | Belgium | Feb. 15, 1957 |